US006065314A

United States Patent [19]

Nicholson

[11] Patent Number: 6,065,314

[45] Date of Patent: May 23, 2000

[54] LOCK FOR FREIGHT CONTAINERS

[76] Inventor: John W. Nicholson, 302 N. Clear Creek, Friendswood, Tex. 77546

[21] Appl. No.: 09/083,529

[22] Filed: May 22, 1998

[51] Int. Cl.$^{7}$ .......... B60R 25/02

[52] U.S. Cl. .......... 70/212; 70/56; 292/218

[58] Field of Search .......... 70/212, 54–56; 292/218

[56] References Cited

U.S. PATENT DOCUMENTS

| | | | |
|---|---|---|---|
| 4,082,330 | 4/1978 | McWhorter | 292/218 |
| 4,134,281 | 1/1979 | Pelcin | 70/208 |
| 4,627,248 | 12/1986 | Haworth | 70/134 |
| 4,648,636 | 3/1987 | Reynard | 292/39 |
| 4,742,701 | 5/1988 | Scavetto | 70/54 X |
| 4,768,816 | 9/1988 | Bakula | 292/218 |
| 4,877,276 | 10/1989 | Pastva | 292/218 |
| 4,895,007 | 1/1990 | Eberly | 70/54 |
| 4,898,008 | 2/1990 | Eberly | 70/56 |
| 5,035,127 | 7/1991 | Larsen | 70/56 |
| 5,092,143 | 3/1992 | Rumbles | 70/212 X |
| 5,118,149 | 6/1992 | Emmons | 70/56 X |
| 5,154,458 | 10/1992 | Cook et al. | 292/218 |
| 5,171,047 | 12/1992 | Korb et al. | 292/39 |
| 5,265,920 | 11/1993 | Kaup et al. | 292/40 |
| 5,284,036 | 2/1994 | Rosenbaum | 70/212 X |
| 5,588,314 | 12/1996 | Knezovich | 70/56 |
| 5,642,909 | 7/1997 | Swan et al. | 292/39 |
| 5,735,146 | 4/1998 | Taplin | 70/212 X |
| 5,743,118 | 4/1998 | Anderson | 70/56 |
| 5,782,115 | 7/1998 | Judy | 70/212 X |

FOREIGN PATENT DOCUMENTS

| | | | |
|---|---|---|---|
| 2233036 | 1/1991 | United Kingdom | 70/54 |

*Primary Examiner*—Suzanne Dino Barrett
*Attorney, Agent, or Firm*—Mark R. Wisner

[57] ABSTRACT

A locking mechanism used to provide heightened security for storage containers. The locking mechanism uses a padlock to lock the doors, but unlike past inventions the padlock has only limited exposure to the outside of the storage container. This prevents thieves or vandals from being able to pry or break the lock open. Further, the essential components of the locking mechanism are all housed in a protective frame which prohibits tampering with the individual components of the door lock mechanism.

14 Claims, 5 Drawing Sheets

LOCK FOR FREIGHT CONTAINERS

BACKGROUND OF THE INVENTION

The present invention relates to a locking mechanism providing a high degree of security for the container on which it is mounted. More particularly, the present invention relates to a locking mechanism of the type used to secure, maintain, and provide locked security for pivoting doors used on freight containers, trucks, and/or trailers.

Prior locking mechanisms have proven unsatisfactory in regards to providing security to the contents of the container. Because the chain or padlock used in prior locking mechanisms is exposed on the outside surface of the container door, thieves or vandals are able to cut or pry open the locking mechanism.

It is, therefore, an object of the present invention to provide a new and improved locking mechanism which shields the lock from prying or cutting so as to overcome the above mentioned problem which limits the utility of prior door locks. The novel locking mechanism provides enhanced security while maintaining ease of use.

Other objects, and the advantages, of the present invention will be made clear by the following detailed description of a preferred embodiment constructed in accordance with the teachings of the present invention.

SUMMARY OF THE INVENTION

These objects are achieved by providing a door lock mechanism operated and controlled by a locking handle mounted on a pivot pin. Affixed to the handle are one or more locking bars that extend vertically the full length of the door, with the ends engaging locking bar receptacles located on the interior frame of the container. Mounted to one of the locking bars is a catch that moves along with the locking bars such that as the handle is moved to the closed position, the catch passes through the open hasp of a padlock, the padlock being enclosed in a protective housing which both shields the padlock from cutting and prying and which is engaged by the padlock when the handle is moved and which therefore prevents the padlock from vertical movement after the padlock is closed. Once the lock catch is displaced through the open hasp, the padlock hasp is closed and the padlock, catch, and consequently the locking bar are all prevented from movement. The entire locking mechanism is protected by an enclosure formed by a structural frame and the structural frame can be attached to the door of a freight container, truck trailer, or other container and, when attached to such a container, only one end of the handle and the end of the padlock into which the key is inserted to unlock the padlock are exposed.

In another aspect, the present invention provides a method of locking a pivoting handle in a fixed closed position using a locking mechanism comprised of the handle, a locking bar, a lock catch mounted to the locking bar, a padlock, and a protective housing. The method comprises the steps of positioning the padlock in the protective housing with the hasp open, pivoting the handle in a first direction so that the locking bar is moved along with the handle and the attached catch travels through the open hasp of the padlock, and forcing the padlock into the protective housing to close and lock the padlock around the catch. When closed and locked around the catch in this manner, the padlock engages the protective housing to resist pivoting of the handle in the second direction and consequent movement of the locking bar.

In a particularly preferred embodiment of the method of the present invention, the handle, locking bar, catch, padlock, and protective housing are mounted to the door of a container and the locking bar is moved into and out of engagement with structure on the container when the handle is moved in the first and second directions to resist and allow opening of the door of the container.

As noted above, a principal advantage of the locking mechanism of the present invention is the limited exposure of the padlock to potential thieves. The housing of the padlock, together with the structural frame, encloses the entire locking mechanism, thereby preventing thieves and vandals from being able to grasp the padlock to cut or pry it open. Further, this advantage is obtained while maintaining the ease of use of the door and locking mechanism.

Another advantage of the locking mechanism of the present invention is provided by the shape of the protective housing. Because the only access to the padlock is from the end, or bottom, of the padlock into which the key is inserted, it is not possible to grasp the hasp of the padlock to assist in closing the padlock to lock the locking mechanism. Consequently, the protective housing is shaped so that force exerted on the end of the padlock into which the key is inserted causes the hasp of the padlock to close and lock around the catch extending therethrough.

Other advantages of the present invention will be made clear to those skilled in the art by the following description of a presently preferred embodiment thereof, it being understood that this description is being provided for purposes of exemplification and that other embodiments can be constructed in accordance with the teachings of the present invention which function to achieve those same advantages but that due to limitations of practicality and brevity, and the requirements of the Patent Statute, only the preferred embodiment is described.

DETAILED DESCRIPTION OF THE PREFERRED EMBODIMENT

Figure 1:
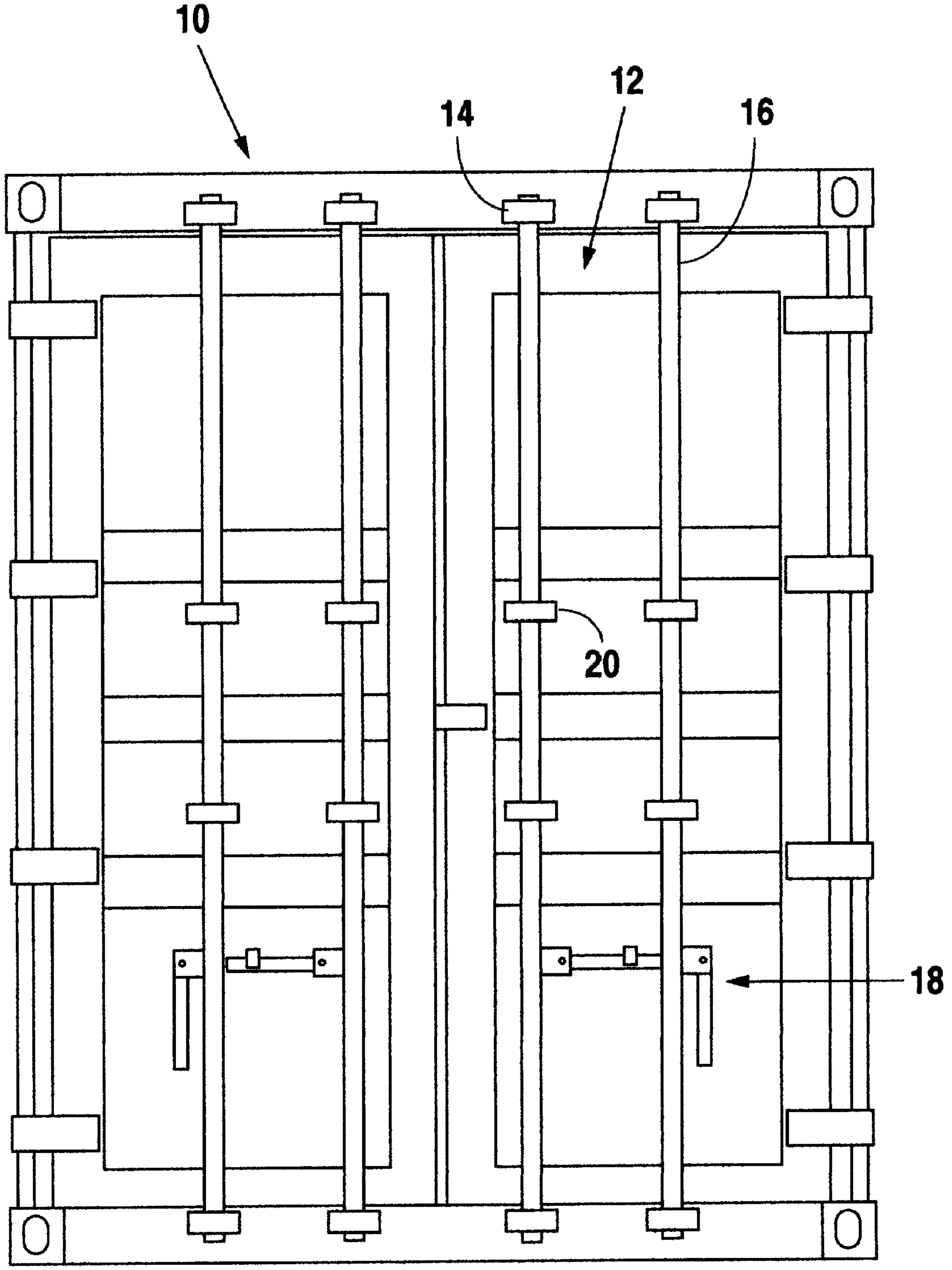
Fig. 1 (PRIOR ART)
FIG. 1 an elevational view of the end of a typical container of the type used for shipping containerized freight showing the doors and a locking mechanism of a type known in the art. The components of the locking mechanism of the type known in the art are all external to the container.

A freight container having a typical latching and locking mechanism of a type known in the art is shown in FIG. 1.

The typical configuration involves one or more locking bars 16, the movement of which is controlled by a locking handle 18. The locking bars are guided by brackets 20 attached to the exterior surface of the door 12 and which guide the locking bars into the locking hasps 14 attached to the frame 11 of the storage container 10 to secure the door 12 in a closed position. Once secured, known locking mechanisms lock the door in the closed position by use of a padlock or chain attached to the handle in such a way as to prevent further movement of the handle. All of the components of such prior mechanisms, including the lock, are exposed on the outside surface of the door. Thus, thieves or vandals have easy access to the components of the lock mechanism and can therefore gain access to the contents of the storage container.

Figure 2:
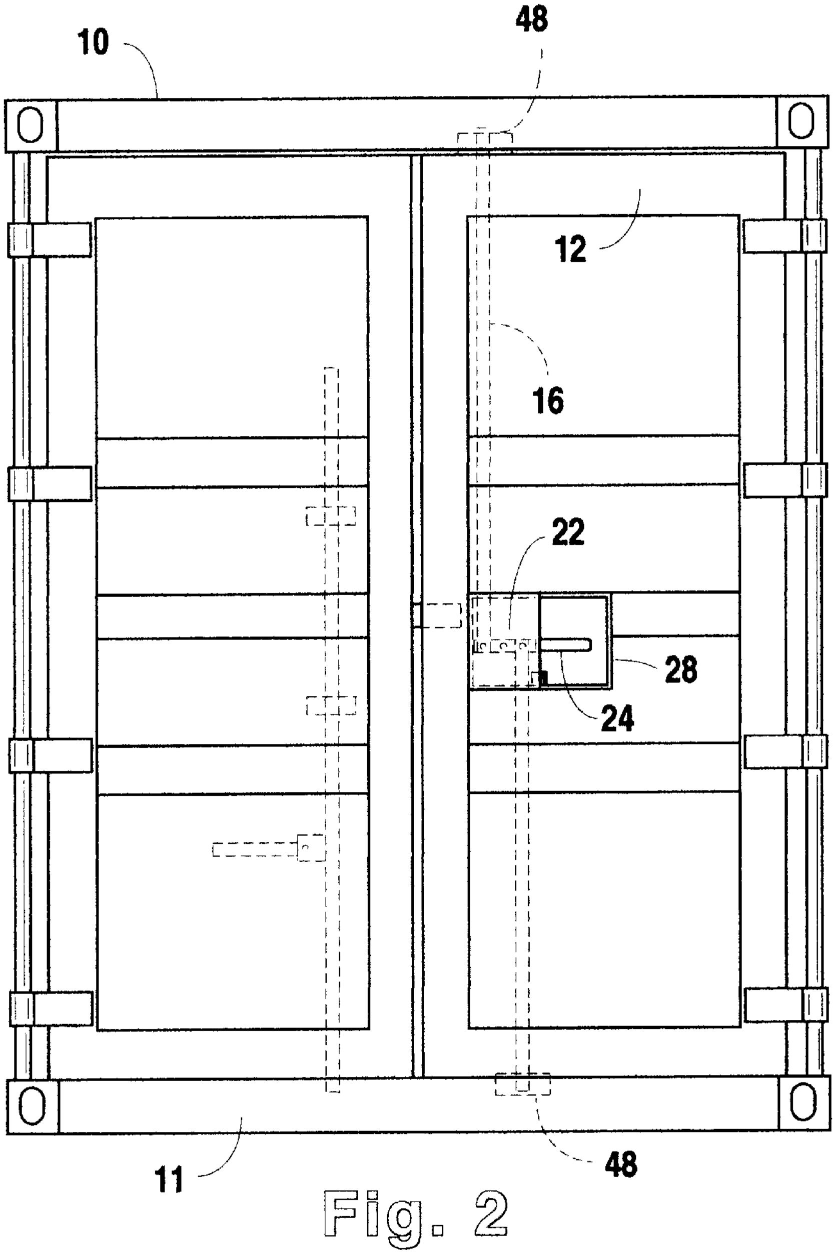
FIG. 2 is an elevational view a container similar to the container of FIG. 1 having the locking mechanism of the present invention installed thereon. The only components of the locking mechanism which are exposed to the exterior of the container are the butt end of the locking handle and the key end of the padlock.
Figure 2A:
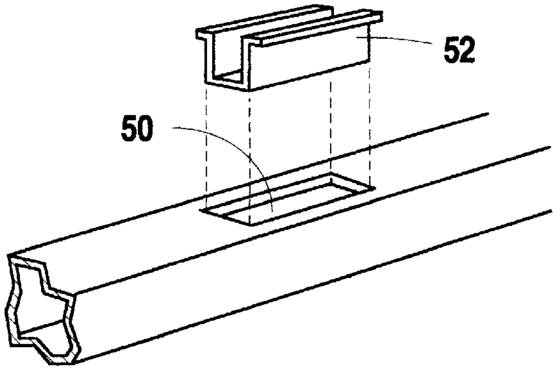
FIG. 2*a* is an exploded view of a portion of the frame of the container of FIG. 2 showing the lower locking bar receptacle which the doors of the container engage to lock the doors in their closed position.

Referring to FIG. 2, a preferred embodiment of the door lock mechanism of the present invention is indicated generally at numeral 22. Locking mechanism 22 is comprised of a structural frame, indicated generally by numeral 28, which is inset into the door 12 of the storage container 10. Insetting the enclosure into the door in this manner encloses all of the components of the locking mechanism of the present invention, including the locking bars 16 and their respective locking bar receptacles which are located on the door frame 11 of storage container 10.

FIG. **2*a* shows a detailed exploded view of the lower locking bar receptacle 48 which is engaged by the lower end of the elongate locking bar 16 when the doors are latched in the closed position. The locking bar receptacles are comprised of slots 50 cut in the upper and lower interior door frame 11 and "U"-shaped channels 52 mounted in slots 50. Alternatively, hasps attached to the interior frame can be used to receive and hold the locking bars in place in the manner known in the art. However, hasps lack the principle advantage of the locking bar receptacles 48** of the preferred embodiment shown in that they are located on the outside of the container and therefore susceptible to attack in the event it is desired to break into the container.

The locking bar receptacles 48 of the preferred embodiment confer an additional advantage on the locking mechanism of the present invention. Specifically, as the ends of locking bars 16 are raised or lowered into the "U"-shaped channel 52 by moving handle 24 in the manner described below, if the locking bars are not properly aligned for insertion, the force imposed by the channel on the portion of the frame surrounding the slot 50 enables the frame to flex enough to securely receive the locking bars 16. Because the containers used for shipping freight by land, air, and sea experience significant wear and tear through repeated use, the advantage achieved by the locking bar receptacles 48 to enable secure closing is substantial.

Figure 3:
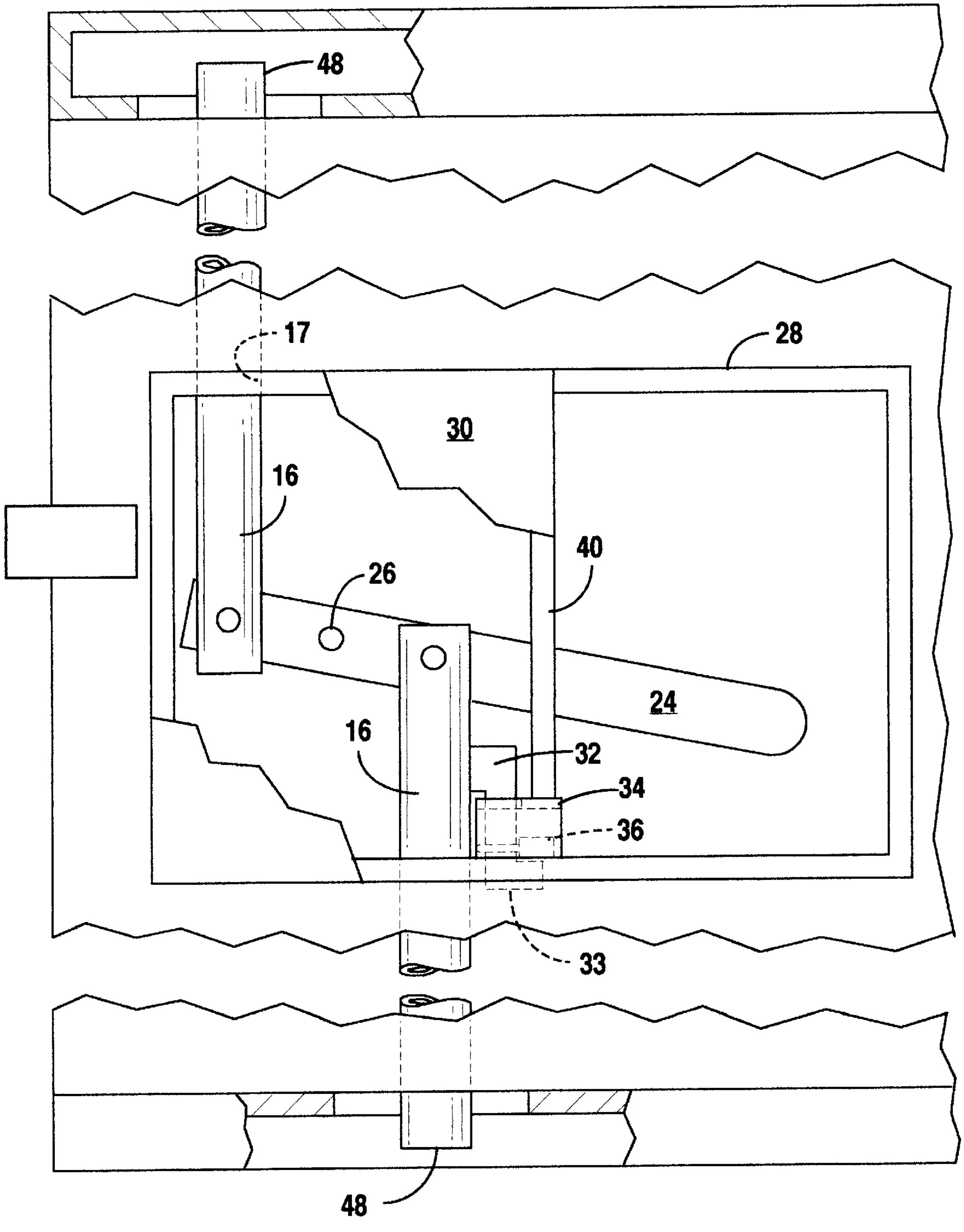
FIG. 3 is a detailed front elevational view of the locking mechanism of FIG. 2 showing a portion of the front protective plate of the locking mechanism cut away to show the details of construction thereof.
Figure 5:
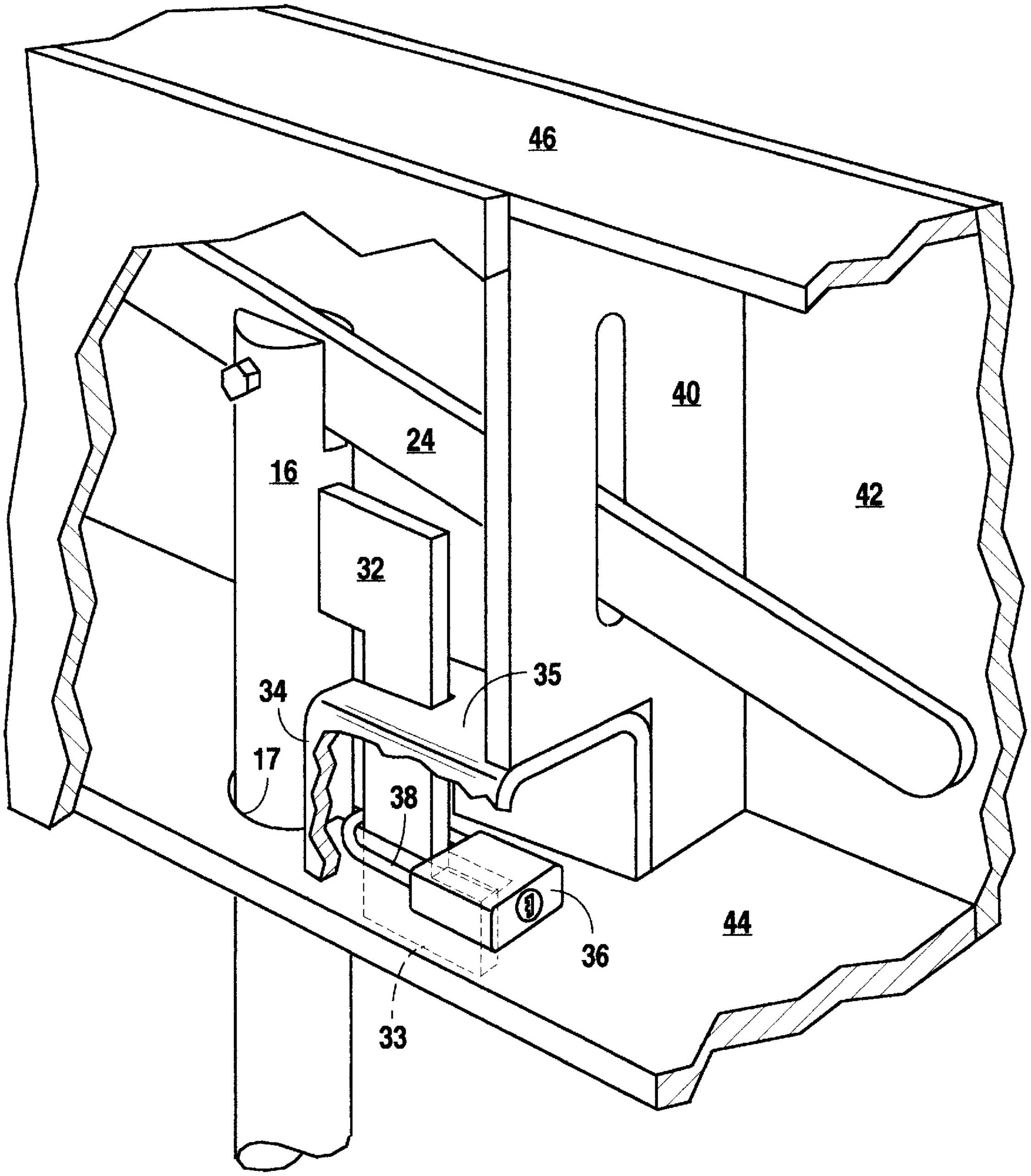
FIG. 5 is a perspective view of the locking mechanism with a portion of the enclosure for the locking mechanism cut away.

FIGS. 3 and 5, respectively, provide a front elevational and a front perspective view of the individual components of the locking mechanism 22. Both views are shown with a portion of the enclosure formed by structural frame 28 cut away. The portion of the frame 28 cut away is the protective plate 30 which sits flush with the exterior surface of the storage container door 12 and which, along with guide plate 40, prevents the door lock mechanism 22 components from being exposed to the exterior of the storage container 10.

The door lock mechanism 22 is controlled by an elongate locking handle 24. The locking handle 24 is affixed to a pivoting pin 26 which is attached to the rear plate 42 of the structural frame 28. One end of locking handle 24 extends through a guide plate 40 which is integral with frame 28 and which limits the range of movement of the locking handle 24 and the other end of handle 24 and pivoting pin 26 are enclosed within frame 28.

Elongate locking bars 16 are pivotally mounted to handle 24 inside frame 28 and extend through holes 17 in frame 28 such that when the handle is moved, the bars are moved vertically into or out of the locking bar receptacles 48. Although the preferred embodiment shown in the figures is provided with two locking bars, one of which is moved upwardly by moving handle 24 and the other downwardly, alternative designs may include a varying number of bars depending on the size of the storage container. Movement of the locking bars 16 is guided in part by the holes 17 cut out of the top plate 46 and the base plate 44 of the structural frame 28. In addition to the holes 17, brackets or other structure (not shown) in the interior of the door 12 can be provided to aid in guiding the ends of the locking bars 16 which extend out of frame 28 into the locking bar receptacles 48 in the manner described above.

Attached to one of the locking bars 16 is an elongate lock catch 32 comprised of a "Z"-shaped bracket which is mounted at the end inside the enclosure formed by frame 28 to the locking bar 16. The long leg of the bracket extends in a direction which is substantially parallel to but spaced apart from the surface of locking bar 16 to form a slot (not numbered) therebetween. As best shown in FIG. 5, the lower portion of catch 32 extends through a slot in a protective housing 34 which is integral with the frame 28 and through the open hasp of a padlock 36 positioned in housing 34. Thus, in the preferred embodiment shown, the lower portion of the catch 32 is an "L"-shaped piece that moves freely through the open hasp 38 of padlock 36 when handle 24 is pivoted. Once hasp 38 is closed around the long leg of catch 32, the bottom leg 33 of the "L"-shaped portion of catch 32 prevents further movement of the catch 32, as well as the locking bar 16 to which catch is mounted and the handle 24 to which locking bar 16 is mounted, by engagement of the body 39 of padlock 36 by the top surface of the bottom leg 33 of catch 32. As best shown in FIG. 3, in the preferred embodiment, the bottom leg 33 of catch 32 extends at an angle to the long leg of catch 32 in a direction which is preferably substantially parallel to the top surface 35 of housing 34. Those skilled in the art who have the benefit of this disclosure will recognize that lock catch 32 can be shaped differently than as shown and described herein as long as the catch moves freely through the open hasp 38 of padlock 36 and structure is provided to accomplish the function of the bottom leg 33 of catch 32, e.g., to interfere with movement of the catch 32 relative to padlock 36 when padlock 36 is closed.

As noted above, attached to the protective housing 34 is the guide plate 40 which is also attached to the top plate 46, bottom plate 44, back plate 42, and protective front plate 30 of the structural frame 28. Thus, none of the mechanical workings of the locking mechanism of the present invention is exposed to the exterior of container 10. Both the base plate 44 and the upper surface 35 of protective housing 34 are provided with slots which allow catch 32 to move through the top surface 35 in the vertical direction. Once the "L"-shaped portion of catch 32 passes through the open hasp 38 of the padlock 36, the key end of the padlock 36 is pushed into the protective housing 34 to close the hasp and lock the device. To aid in closing the hasp 38 of padlock 36, the side walls of the protective housing 34 are curved inwardly so that housing 34 is funnel shaped to conform to the shape of the padlock hasp 38.

Because only the key end of the padlock 36 is exposed to the exterior of the storage container 10, the locking mechanism of the present invention allows the container to be locked and shipped while the keys are shipped separately to those who have rightful access to the container or carried by the person with custody of the container. The padlock 36 may be any conventional padlock of suitable size, shape, and strength and one of the advantages of the locking mechanism of the present invention is that it is capable of being used with a padlock which is supplied by the shipper in accordance with customary procedures in the shipping industry.

Figure 4:
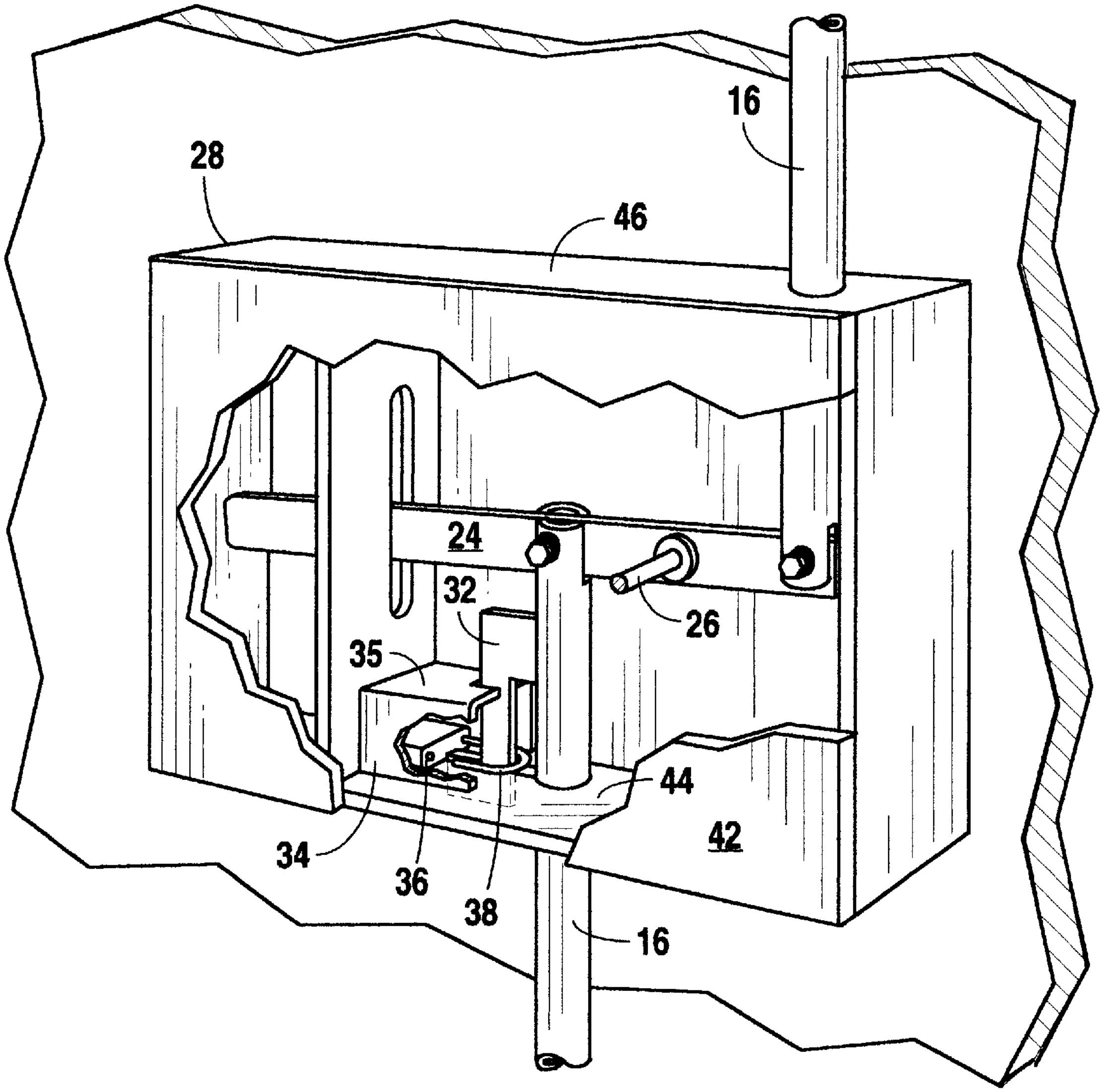
FIG. 4 is a perspective view of the locking mechanism of FIG. 2 shown from the inside of the container and with a portion of the rear plate of the structural frame of the enclosure of the locking mechanism cut away.

Referring to FIG. 4, the preferred embodiment is shown from inside the container 10. The rear plate 42 of frame 28 has been cut away to show the construction of the locking mechanism, but in the preferred embodiment is flush with the inside surface of the container door 12. Additionally, rear plate 42 is attached to the base plate 44, side plates 45, top plate 46, and guide plate 40 thereby providing structural rigidity to the entire frame 28.

Referring now to FIGS. 2–5, a preferred embodiment of a method of locking a pivoting handle in a fixed closed position will be described. As set out in detail above, the locking mechanism is comprised of the handle 24, a locking bar 16, a lock catch 32 mounted to locking bar 16, a padlock 36, and a protective housing 34, and the method comprises the steps of positioning padlock 36 in the protective housing 34 with the hasp 38 of padlock 36 open. Handle 24 is then pivoted in a first direction so that the locking bar 16 is moved along with handle 24 and the catch 32 affixed to locking bar 16 travels throught the open hasp 38 and padlock 36 is forced into housing 34 to close and lock the padlock around catch 32 so that, when handle 24 is pivoted in the second direction, the padlock 36 engages housing 34 to resist pivoting of the handle 24 and movement of locking bar 16.

Although described in terms of the embodiments shown in the figures, those skilled in the art will recognize from this description that the invention encompasses embodiments other than those which are shown and in which the component parts thereof may be modified without changing the manner in which those parts function to achieve their intended result. All such alternative embodiments are intended to fall within the scope of the following claims.

What is claimed is:

1. A locking mechanism for locking with a padlock comprising:

a walled enclosure;

an elongate handle having one end within said enclosure and the other end extending out of said enclosure through an opening in the wall thereof;

an elongate locking bar pivotally mounted to said handle within said enclosure and extending out of said enclosure through an opening in the wall thereof for selectively engaging other structure when moved by said handle to resist movement of said enclosure relative to the other structure;

an elongate catch mounted to said locking bar within said enclosure and extending out of said enclosure through an opening in the wall thereof for movement relative to said enclosure when said handle is moved, the end of said catch extending through the opening in said enclosure being shaped so as to move through the hasp of an open padlock positioned outside said enclosure when the padlock is open and said handle is moved and to engage the body of the padlock when the padlock is closed to cause the padlock to engage the wall of said enclosure to resist movement of said handle.

2. The locking mechanism of claim 1 wherein the opening in the wall of said enclosure through which said catch extends is located in a housing formed in the wall of said enclosure and shaped so as to receive the body of the padlock therein.

3. The locking mechanism of claim 1 wherein each of the openings in the wall of said enclosure is formed in the shape of a narrow slot.

4. The locking mechanism of claim 1 additionally comprising a second elongate locking bar pivotally mounted to said handle within said enclosure.

5. The locking mechanism of claim 4 wherein said catch is mounted to said second elongate locking bar.

6. The locking mechanism of claim 1 wherein the end of said locking bar which extends through the opening in the wall of said enclosure resists movement of said enclosure relative to the other structure when the padlock is closed around said catch.

7. The locking mechanism of claim 1 wherein said handle is pivotally mounted to the wall of said enclosure within said enclosure.

8. A locking mechanism which uses a padlock to secure the doors of a container in a closed position comprising:

a handle mounted to the door of a container on a pivot pin for rotation about the axis of said pivot pin;

an elongate locking bar mounted at one end to said handle for movement therewith as said handle pivots about the axis of said pivot pin, the other end engaging and disengaging the container as said handle is moved;

a catch having one end attached to said locking bar for movement along with said locking bar;

a padlock including a hasp, said catch extending through the hasp of said padlock and movable relative thereto when said padlock is open; and a protective housing which restricts movement of said padlock when said padlock is closed around said catch, resistance to movement of said padlock causing resistance to movement of said locking bar, thereby locking said locking bar into engagement with the container.

9. The locking mechanism of claim 8 wherein said locking bar moves along a single line of action through a plurality of guides affixed to the container.

10. The locking mechanism of claim 8 wherein said protective housing is funnel shaped to fit closely around the hasp of said padlock when said padlock is closed.

11. The locking mechanism of claim 8 additionally comprising a second locking bar mounted to said handle for movement therewith.

12. The locking mechanism of claim 11 additionally comprising an enclosure inset into the door of the container comprising:

a top plate with an opening through which said locking bar extends and which helps to guide the movement of said locking bar;

a bottom plate to which said protective housing is attached having an opening through which said locking bar extends which guides the movement of said locking bars;

two side plates to which the top and bottom plates are attached to form the structural frame;

a rear plate that provides a rear covering for the entire structural frame and provides structural reinforcement;

a guide plate extending from said protective housing to the top plate and having a slot through which said handle extends; and a front plate flush with the exterior surface of the door covering said handle and the pivotal mount of said handle to said door.

13. The locking mechanism of claim 11 wherein the ends of said locking bars are received by receptacles upon movement of said handle, said receptacles comprising a "U"-shaped channel comprised of a rigid material and a slot cut out of the frames of the door of the container into which said channels are inserted such that when said locking bars are received by said channels, the portion of the door frame surrounding said slots flexes for engagement by said locking bars when said locking bars are not exactly aligned with said slots.

14. A locking mechanism used to keep a pivoting handle in a closed position comprising:

a handle mounted on a pivot pin;

a locking bar affixed to said handle such that as said handle pivots, said locking bar is displaced;

a catch mounted to said locking bar for movement therewith;

a padlock including a hasp, said catch extending through the hasp of said padlock and movable relative thereto when said padlock is open; and a protective housing around said padlock which is engaged by said padlock and which restricts movement of said padlock when said padlock is closed around said catch and said handle is moved.

* * * * *